US006824141B1

United States Patent
Sakamaki et al.

(10) Patent No.: US 6,824,141 B1
(45) Date of Patent: Nov. 30, 2004

(54) CHUCK DEVICE

(75) Inventors: Kazuo Sakamaki, Ojiya (JP); Akira Sakamaki, Ojiya (JP); Chokichi Sato, Ojiya (JP); Tadashi Taniguchi, Ojiya (JP)

(73) Assignee: Yukiwa Seiko Kabushiki Kaisha, Niigata-Ken (JP)

( * ) Notice: Subject to any disclaimer, the term of this patent is extended or adjusted under 35 U.S.C. 154(b) by 16 days.

(21) Appl. No.: 10/662,584

(22) Filed: Sep. 15, 2003

Related U.S. Application Data

(63) Continuation of application No. 09/983,499, filed on Oct. 23, 2001, now Pat. No. 6,659,474.

(30) Foreign Application Priority Data

Aug. 30, 2001 (JP) ........................................ 2001-260708

(51) Int. Cl.[7] .............................................. B23B 31/16
(52) U.S. Cl. .......................... 279/62; 279/140; 279/902
(58) Field of Search .............................. 279/60, 61, 62, 279/140, 157, 902

(56) References Cited

U.S. PATENT DOCUMENTS

| 5,458,345 | A | 10/1995 | Amyot | |
| 5,741,016 | A | * | 4/1998 | Barton et al. ................. 279/62 |
| 5,765,839 | A | | 6/1998 | Rohm |
| 5,829,761 | A | | 11/1998 | Rohm |
| 6,517,088 | B1 | | 2/2003 | Rohm |
| 6,550,785 | B2 | | 4/2003 | Rohm |
| 6,581,942 | B2 | * | 6/2003 | Rohm ......................... 279/62 |

FOREIGN PATENT DOCUMENTS

| DE | 44 38 991 | 5/1996 |
| EP | 0 710 518 | 4/1995 |
| FR | 2 702 975 | 9/1994 |

* cited by examiner

Primary Examiner—Daniel W. Howell
Assistant Examiner—Luke Parsons
(74) Attorney, Agent, or Firm—Alston & Bird LLP

(57) ABSTRACT

A chuck is provided having a body, oblique guides converging toward a forward portion of the body, and a groove around the body. A slidable jaw within each guide includes outer threads. A rotatable mechanism engaging the groove includes threads for engaging the jaw threads. A toothed member extends around the body. An inner sleeve extends over and rotates the mechanism, while moving the jaws toward the forward portion. An outer sleeve extends over the inner sleeve. A metal intermediate sleeve between the inner and outer sleeves engages two spring members engaged with the inner sleeve. A first torque application rotates the intermediate sleeve with respect to the inner sleeve and causes one of the spring members to ratchet with the toothed member. A greater second torque application to the intermediate sleeve causes the other spring member to prevent rotation between the intermediate and inner sleeves.

11 Claims, 12 Drawing Sheets

CHUCK DEVICE

CROSS-REFERENCE TO RELATED APPLICATION

This application is a continuation of U.S. application Ser. No. 09/983,499, Oct. 23, 2001 now U.S. Pat. No. 6,659,474, which claims the benefit of Japanese Application No. JP 2001-260708, filed Aug. 30, 2001, both of which are incorporated herein in their entirely.

BACKGROUND OF THE INVENTION

The present invention relates to a chuck device for clamping a tool.

Conventionally, chuck devices have been proposed.

These chuck devices are to be provided to an electric power tool. A predetermined tool such as a cutter blade (drill) is clamped by means of the chuck device for drilling or the like.

By the way, a so-called hummer drill, a vibrating drill or the like for good drilling work while imparting a shock or a vibration has been used as the electric power tool.

This kind of the electric power tool is used for intermittently imparting a force (propelling force) in an axial direction. As a result, a twist force is likely to occur intermittently in the coupled tool so that the tool is loosened.

SUMMARY OF THE INVENTION

An object of the present invention is to provide a chuck device that may solve the problems, and that is simple in structure and superior in durability.

In order to attain this and other objects, according to the present invention, there is provided a chuck device in which a chuck device in which a plurality of claws provided at a tip end of a body is slidingly opened and closed to clamp a tool with the claws by rotation of a rotary sleeve, wherein an annular ratchet tooth wheel is provided in the body, an annular nut member that engages with the claws and rotates together with the rotary sleeve is provided inside the rotary sleeve and behind the ratchet wheel within the body, a retainer spring member that is composed of a leaf spring made of metal and detached and attached for engaging the ratchet tooth wheel is disposed outside of the ratchet tooth wheel, the retainer spring member is provided under the condition the retainer spring member is rotated around the ratchet wheel in accordance with a rotation of a retainer spring receiving sleeve within the retainer spring receiving sleeve that rotates together with the nut member and that is fitted around the nut member and made of metal, the retainer spring member is mounted on the retainer spring receiving sleeve by a convex/concave engagement means, a holder spring member that is composed of a metal made leaf spring formed as a detachable/attachable separate member from the retainer spring member for holding a retention release condition between the ratchet tooth wheel and the retainer spring member and the retention condition between the ratchet tooth wheel and the retainer spring member is disposed at a position facing the retainer spring member outside the ratchet tooth wheel, the holder spring member is adapted in the retainer spring receiving sleeve to rotate around the ratchet tooth wheel in accordance with the rotation of the retainer spring receiving sleeve, the holder spring member is mounted on the retainer spring receiving sleeve by the concave/convex engagement means, a metal made working sleeve that rotates together with the rotary sleeve and rotates through a predetermined angle relative to the retainer spring receiving sleeve is provided in the retainer spring receiving sleeve, a retainer working portion is provided in the working sleeve, the retainer working portion being composed of a retainer holder portion for maintaining a retention condition between the ratchet tooth wheel and the retainer spring member and a pressure portion for depressing the projection of the retainer spring member which is to be inserted into a hole portion of the retainer spring receiving sleeve and retaining the retainer spring member to the ratchet tooth wheel, a position holder portion for holding a position of the working sleeve to the retainer spring receiving sleeve to thereby hold the retention condition between the retainer spring member and the ratchet tooth wheel and the release condition between the retainer spring member and the ratchet tooth wheel is provided in the working sleeve, and the position holder portion is constituted by a projection of the holder spring member and a hole portion which is formed in the working sleeve and into which the projection is inserted, the projection is engaged with an elongated hole provided in the retainer spring receiving sleeve, the elongated hole has a tip end opening shape cut away from a tip end edge to a proximal end side of the retainer spring receiving sleeve so that the working sleeve may rotate within a range of the elongated hole to the retainer spring receiving sleeve and the nut member may rotate with the projection in contact with an inner end of the elongated hole, and the hole portion into which the projection of the retainer spring member is inserted has a tip end opening shape cut away from the tip end edge to the proximal end side of the retainer spring receiving sleeve.

According to the present invention, a chuck device in which a plurality of claws provided at a tip end of a body is slidingly opened and closed to clamp a tool with the claws by rotation of a rotary sleeve, is characterized in that an annular ratchet tooth wheel is provided in the body, an annular nut member that engages with the claws and rotates together with the rotary sleeve is provided inside the rotary sleeve and behind the ratchet wheel within the body, a retainer spring member that is composed of a leaf spring made of metal and detached and attached for engaging the ratchet tooth wheel is disposed outside of the ratchet tooth wheel, the retainer spring member is provided under the condition the retainer spring member is rotated around the ratchet wheel in accordance with a rotation of a retainer spring receiving sleeve within the retainer spring receiving sleeve that rotates together with the nut member and that is fitted around the nut member and made of metal, a structure in which a projection formed in the retainer spring member is fitted in a hole portion formed in the retainer spring receiving sleeve is provided for mounting the retainer spring member onto the retainer spring receiving sleeve, a holder spring member that is composed of a metal made leaf spring formed as a detachable/attachable separate member from the retainer spring member for holding a retention release condition between the ratchet tooth wheel and the retainer spring member and the retention condition between the ratchet tooth wheel and the retainer spring member is disposed at a position facing the retainer spring member outside the ratchet tooth wheel, the holder spring member is adapted in the retainer spring receiving sleeve to rotate around the ratchet tooth wheel in accordance with the rotation of the retainer spring receiving sleeve, the holder spring member is mounted on the retainer spring receiving sleeve by the structure in which the projection formed in the retainer spring member is fitted in the hole portion formed in the retainer spring receiving sleeve, a metal made working sleeve that rotates together with the rotary sleeve and rotates through a predetermined angle relative to the retainer spring receiving sleeve is provided in the retainer spring receiving sleeve, a retainer working portion is provided in the working sleeve, the retainer working portion being composed of a retainer holder portion for maintaining a retention condition between the ratchet tooth wheel and the retainer spring member and a pressure portion for depressing the projection of the retainer spring member which is to be inserted into a hole portion of the retainer spring receiving sleeve and retaining the retainer spring member to the ratchet tooth wheel, a position holder portion for holding a position of the working sleeve to the retainer spring receiving sleeve to thereby hold the retention condition between the retainer spring member and the ratchet tooth wheel and the release condition between the retainer spring member and the ratchet tooth wheel is provided in the working sleeve, and the position holder portion is constituted by a projection of the holder spring member and a hole portion which is formed in the working sleeve and into which the projection is inserted, the projection is engaged with an elongated hole provided in the retainer spring receiving sleeve, the elongated hole has a tip end opening shape cut away from a tip end edge to a proximal end side of the retainer spring receiving sleeve so that the working sleeve may rotate within a range of the elongated hole to the retainer spring receiving sleeve and the nut member may rotate with the projection in contact with an inner end of the elongated hole, and the hole portion provided in the retainer spring receiving sleeve has a tip end opening shape cut away from the tip end edge to the proximal end side of the retainer spring receiving sleeve.

According to the invention, a chuck device in which a plurality of claws provided at a tip end of a body is slidingly opened and closed to clamp a tool with the claws by rotation of a rotary sleeve, is characterized in that an annular ratchet tooth wheel is provided in the body, an annular nut member that engages with the claws and rotates together with the rotary sleeve is provided inside the rotary sleeve and behind the ratchet wheel within the body, a retainer spring member that is composed of a leaf spring made of metal and detached and attached for engaging the ratchet tooth wheel is disposed outside of the ratchet tooth wheel, the retainer spring member is provided under the condition the retainer spring member is rotated around the ratchet wheel in accordance with a rotation of a retainer spring receiving sleeve within the retainer spring receiving sleeve that rotates together with the nut member and that is fitted around the nut member and made of metal, a structure in which a projection and a hole portion formed in the retainer spring receiving sleeve and a recess portion and a projection formed in the retainer spring member are engaged with each other is provided for mounting the retainer spring member onto the retainer spring receiving sleeve, a holder spring member that is composed of a metal made leaf spring formed as a detachable/attachable separate member from the retainer spring member for holding a retention release condition between the ratchet tooth wheel and the retainer spring member and the retention condition between the ratchet tooth wheel and the retainer spring member is disposed at a position facing the retainer spring member outside the ratchet tooth wheel, the holder spring member is adapted in the retainer spring receiving sleeve to rotate around the ratchet tooth wheel in accordance with the rotation of the retainer spring receiving sleeve, the holder spring member is mounted on the retainer spring receiving sleeve by the structure in which the projection and the hole portion formed in the retainer spring receiving sleeve and the recess portion and the projection formed in the retainer spring member are engaged with each other, a metal made working sleeve that rotates together with the rotary sleeve and rotates through a predetermined angle relative to the retainer spring receiving sleeve is provided in the retainer spring receiving sleeve, a retainer working portion is provided in the working sleeve, the retainer working portion being composed of a retainer holder portion for maintaining a retention condition between the ratchet tooth wheel and the retainer spring member and a pressure portion for depressing the projection of the retainer spring member which is to be inserted into a hole portion of the retainer spring receiving sleeve and retaining the retainer spring member to the ratchet tooth wheel, a position holder portion for holding a position of the working sleeve to the retainer spring receiving sleeve to thereby hold the retention condition between the retainer spring member and the ratchet tooth wheel and the release condition between the retainer spring member and the ratchet tooth wheel is provided in the working sleeve, and the position holder portion is constituted by a projection of the holder spring member and a hole portion which is formed in the working sleeve and into which the projection is inserted, the projection is engaged with an elongated hole provided in the retainer spring receiving sleeve, the elongated hole has a tip end opening shape cut away from a tip end edge to a proximal end side of the retainer spring receiving sleeve so that the working sleeve may rotate within a range of the elongated hole to the retainer spring receiving sleeve and the nut member may rotate with the projection in contact with an inner end of the elongated hole, and the hole portion provided in the retainer spring receiving sleeve has a tip end opening shape cut away from the tip end edge to the proximal end side of the retainer spring receiving sleeve.

According to the present invention, a chuck device in which a plurality of claws provided at a tip end of a body is slidingly opened and closed to clamp a tool with the claws by rotation of a rotary sleeve, is characterized in that an annular ratchet tooth wheel is provided in the body, an annular nut member that engages with the claws and rotates together with the rotary sleeve is provided inside the rotary sleeve and behind the ratchet wheel within the body, a retainer spring member that is composed of a leaf spring made of metal and detached and attached for engaging the ratchet tooth wheel is disposed outside of the ratchet tooth wheel, the retainer spring member is provided under the condition the retainer spring member is rotated around the ratchet wheel in accordance with a rotation of a retainer spring receiving sleeve within the retainer spring receiving sleeve that rotates together with the nut member and that is fitted around the nut member and made of metal, the retainer spring member is mounted on the retainer spring receiving sleeve by a convex/concave engagement means, a holder spring member that is composed of a metal made leaf spring formed as a detachable/attachable separate member from the retainer spring member for holding a retention release condition between the ratchet tooth wheel and the retainer spring member and the retention condition between the ratchet tooth wheel and the retainer spring member is disposed at a position facing the retainer spring member outside the ratchet tooth wheel, the holder spring member is adapted in the retainer spring receiving sleeve to rotate around the ratchet tooth wheel in accordance with the rotation of the retainer spring receiving sleeve, the holder spring member is mounted on the retainer spring receiving sleeve by the concave/convex engagement means, a metal made working sleeve that rotates together with the rotary sleeve and rotates through a predetermined angle relative to the retainer spring receiving sleeve is provided in the retainer spring receiving sleeve, a retainer working portion is provided in the working sleeve, the retainer working portion being composed of a retainer holder portion for maintaining a retention condition between the ratchet tooth wheel and the retainer spring member and a retainer condition release portion for releasing the retained condition between the ratchet tooth wheel and the retainer spring member, a position holder portion for holding a position of the working sleeve to the retainer spring receiving sleeve to thereby hold the retention condition between the retainer spring member and the ratchet tooth wheel and the release condition between the retainer spring member and the ratchet tooth wheel is provided in the working sleeve, and the position holder portion is constituted by a projection of the holder spring member and a hole portion which is formed in the working sleeve and into which the projection is inserted, the projection is engaged with an elongated hole provided in the retainer spring receiving sleeve, and the elongated hole has a tip end opening shape cut away from a tip end edge to a proximal end side of the retainer spring receiving sleeve so that the working sleeve may rotate within a range of the elongated hole to the retainer spring receiving sleeve and the nut member may rotate with the projection in contact with an inner end of the elongated hole.

Also, in the chuck device, each component is made of metal.

DESCRIPTION OF THE PREFERRED EMBODIMENTS

Figure 1:
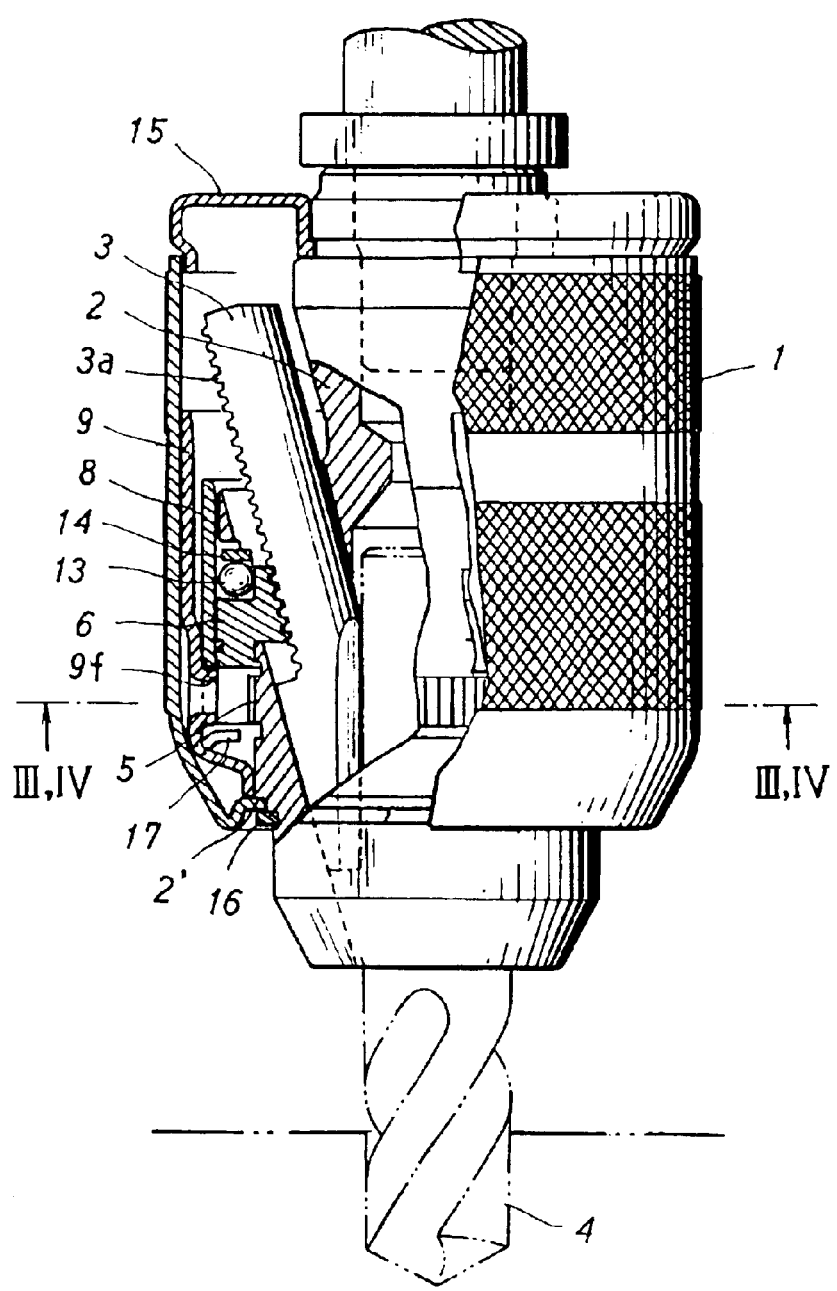
FIG. 1 is a partially fragmentary, frontal view of a chuck device according to a first embodiment of the present invention.
Figure 2:
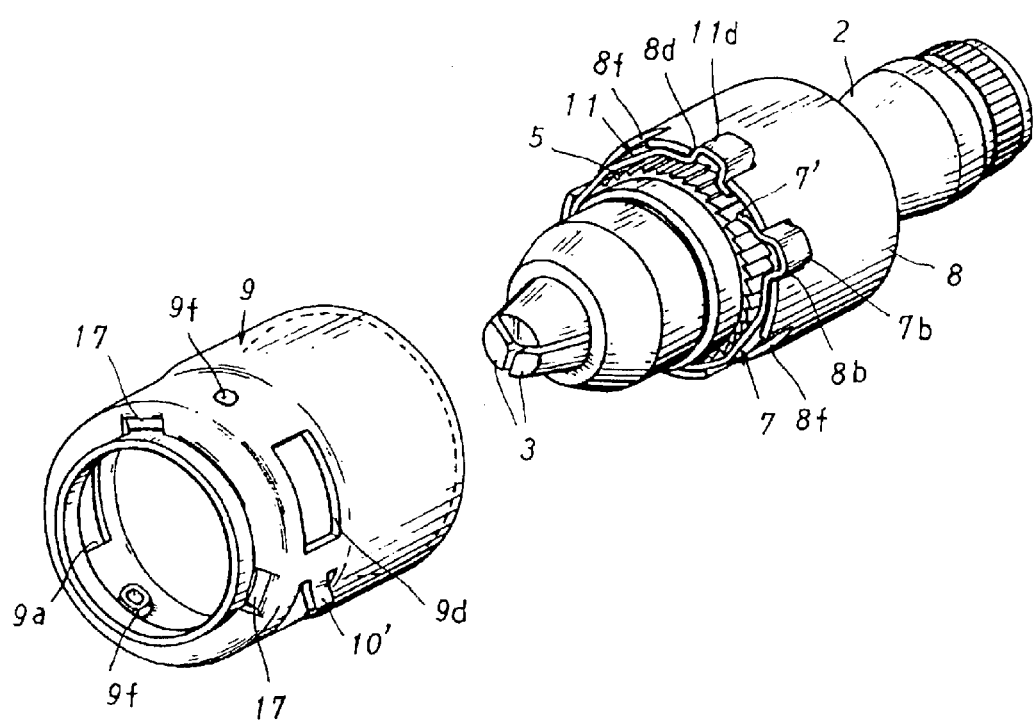
FIG. 2 is an exploded perspective view of a primary part of the chuck device shown in FIG. 1.
Figure 3:
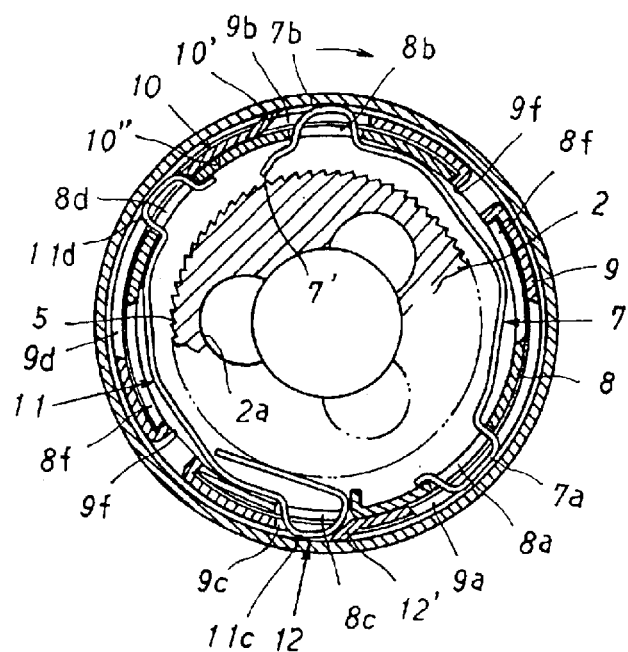
FIG. 3 is a cross-sectional view taken along the line III—III of FIG. 1.
Figure 4:
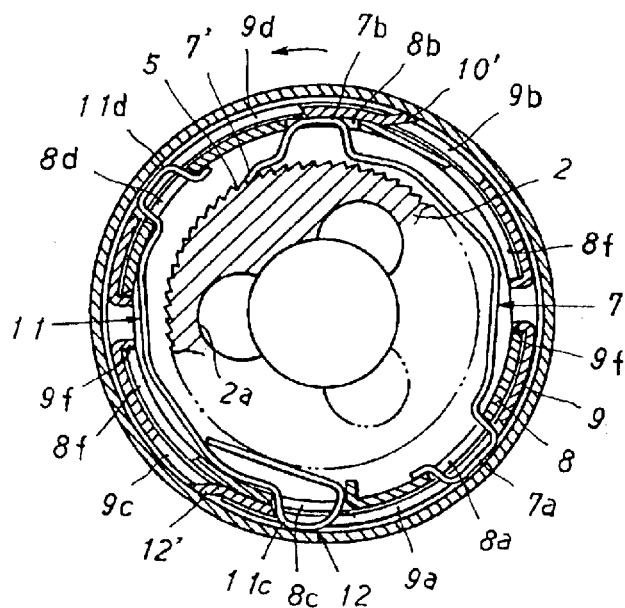
FIG. 4 is a cross-sectional view taken along the line IV—IV of FIG. 1.
Figure 5:
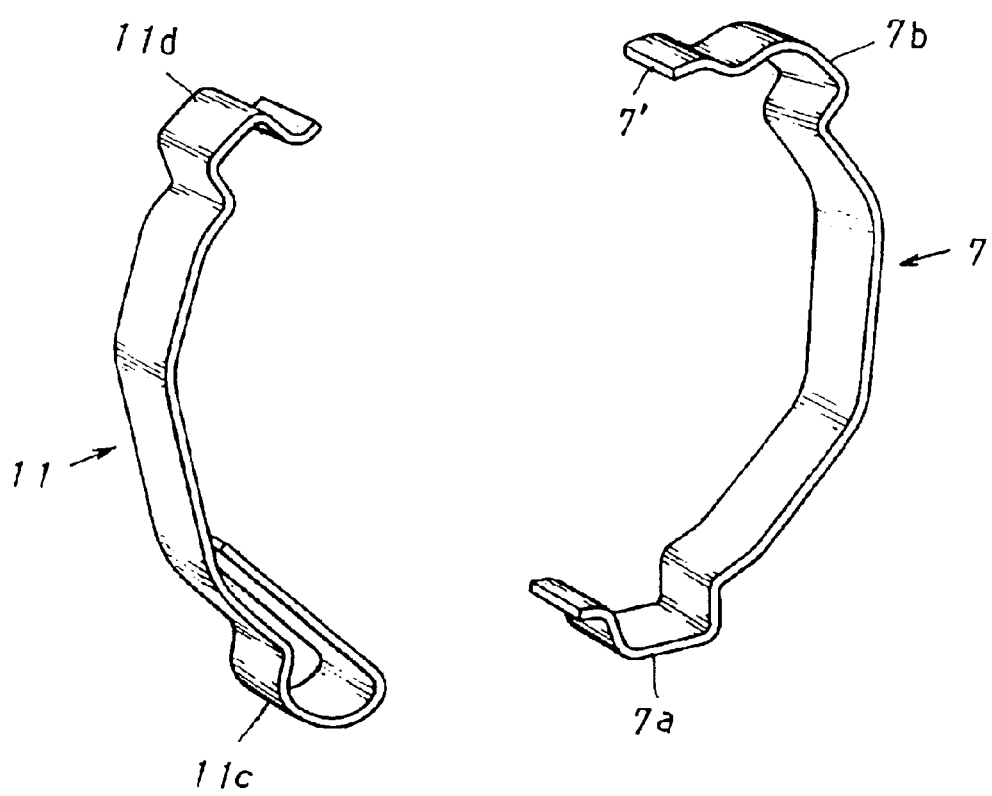
FIG. 5 is a perspective view of a retainer spring member and a holder spring member in accordance with the first embodiment of the present invention.

A first embodiment of the present invention will now be described with reference to FIGS. 1 to 5.

In this embodiment, the components are all made of metal.

Three claws 3 are slanted and provided in holes 2a formed in a body 2. An annular nut member 6 that engages with a screw portion 3a formed in an outer surface of the claws 3 is provided and engaged with the claws 3. Incidentally, the nut member 6 is a split nut member 6 and a shape of the nut member 6 is maintained by a retainer spring receiving sleeve 8 to be described.

Also, an annular ratchet tooth wheel 5 is formed in front of the nut member 6 and in the body 2.

Reference numeral 13 denotes steel balls and numeral 14 denotes steel ball receivers.

The retainer spring receiving sleeve 8 that rotates together with the nut member 6 is engaged with the nut member 6. Hole portions 8a, 8b, 8c and 8d for mounting and rotating a retainer spring member 7 and a holder spring member 11 together with the spring retainer receiving sleeve 8 are provided in the retainer spring receiving sleeve 8. Since each of these hole portions 8a, 8b, 8c and 8d has an open tip end cut away from a distal end edge to a proximal end side of the retainer spring receiving sleeve 8, it is possible to very easily perform the attachment/detachment of the retainer spring member 7 and the holder spring member 11 and it is possible to readily mount the retainer spring member 7 and the holder spring member 11 each of which has any desired spring force.

The retainer spring member 7 and the holder spring member 11 are disposed around the ratchet tooth wheel 5 to face each other. Also, in the form shown in FIG. 5, i.e., in the retainer spring 7, two projections 7a and 7b and a tip end retainer portion 7' for engaging with the ratchet tooth wheel 6 are provided. On the other hand, two projections 11c and 11d are formed in the holder spring member 11. The end portion associated with this projection 11c is bent toward the projection 11d. When the projection 11c is inserted into the hole portion 9a, the bent portion is brought into pressing contact with the ratchet tooth wheel 5 and exhibits the spring force as described later. The retainer spring member 7 is mounted so as to rotate together with the retainer spring receiving sleeve 8 by the hole portions 8a and 8b of the above-described retainer spring receiving sleeve 8 and the projections 7a and 7b of the retainer spring member 7. Also, the holder spring member 11 is mounted so as to rotate together with the retainer spring receiving sleeve 8 by the hole portions 8c and 8d of the above-described retainer spring receiving sleeve 8 and the projections 11c and 11d of the holder spring member 11.

Figure 10:
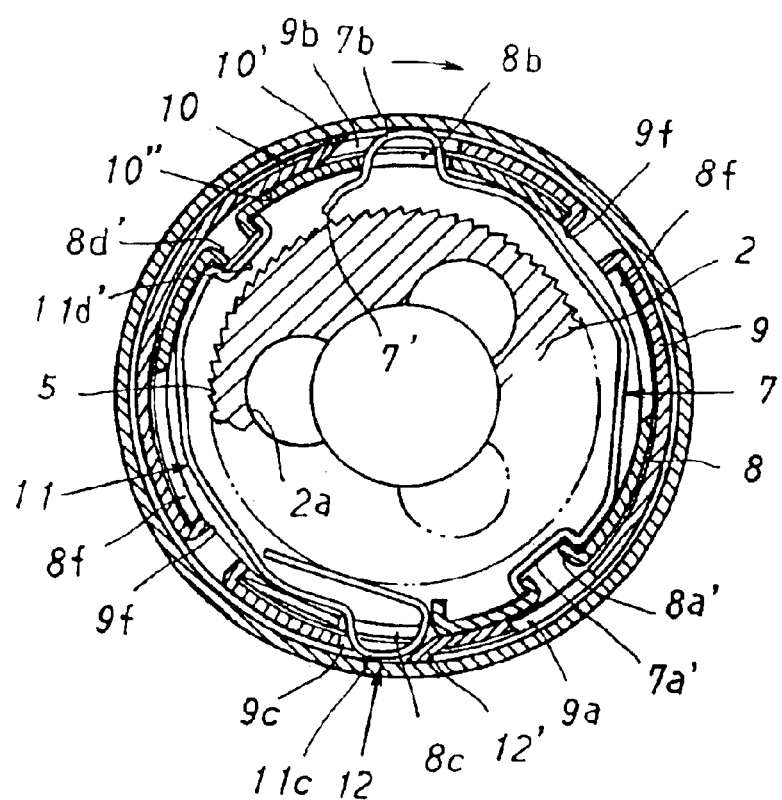
FIG. 10 is a cross-sectional view corresponding to FIG. 3 of another example that is a modification of a part of the first embodiment.
Figure 11:
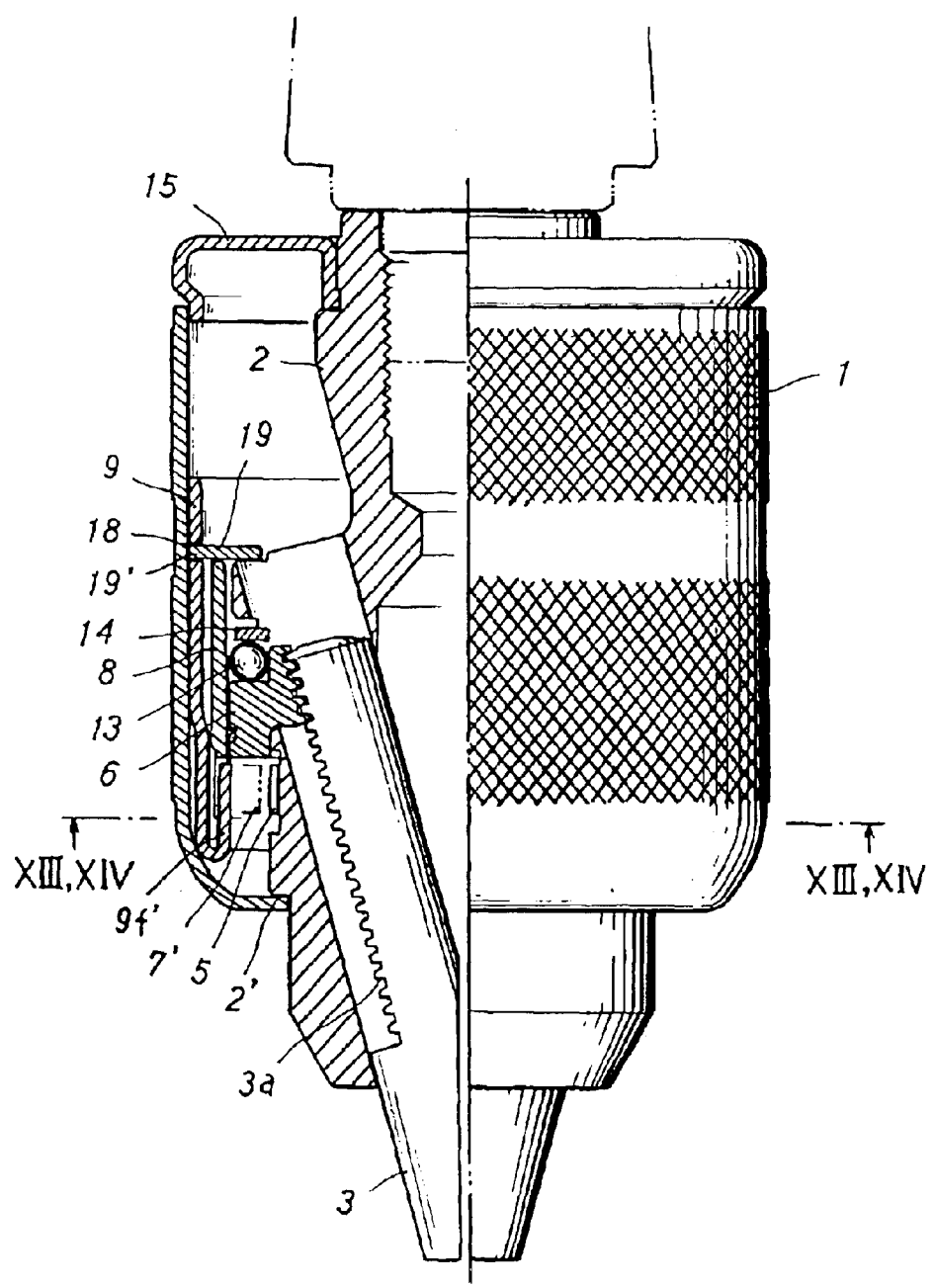
FIG. 11 is a partially fragmentary, frontal view of a chuck device according to a third embodiment of the present invention.
Figure 12:
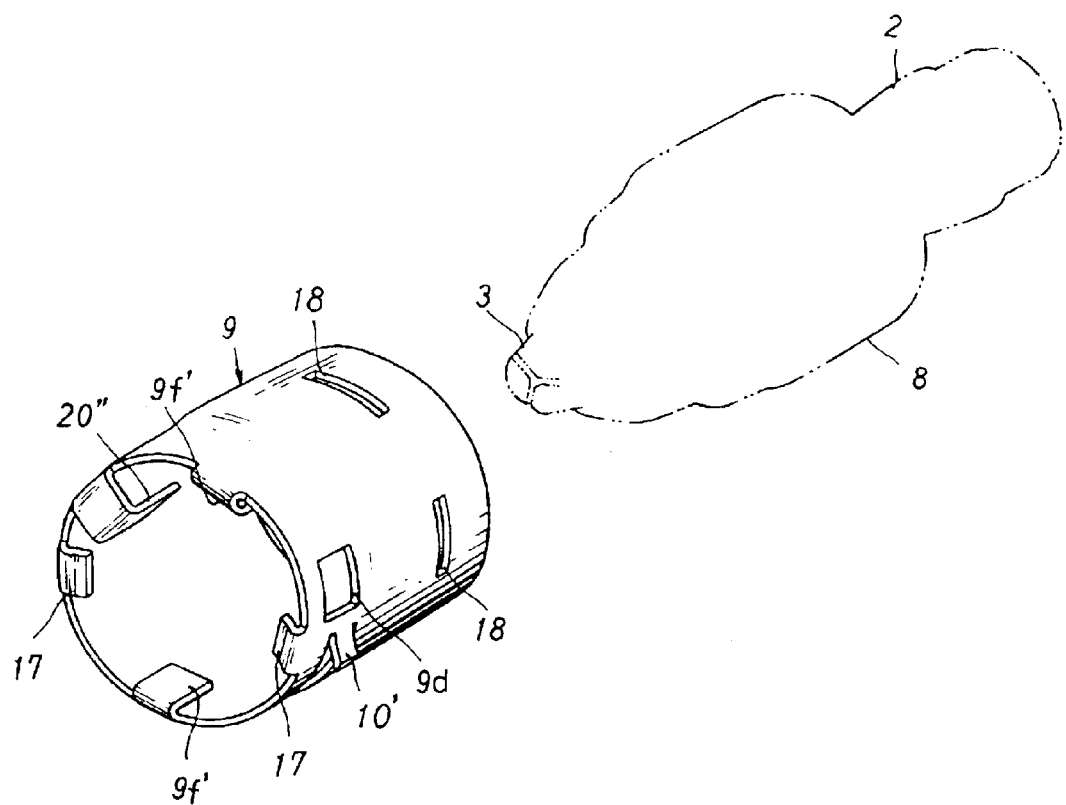
FIG. 12 is an exploded perspective view of a primary part of the chuck device shown in FIG. 11.

Incidentally, for the mounting manner of the projection portion 7a of the retainer spring member 7 and the projection portion 11d of the holder spring member 11 on the retainer spring receiving sleeve 8, for example, recess portions 7a' and 11d' may be provided instead of the projection portion 7a of the retainer spring member 7 and the projection portion 11d of the holder spring member 11 as shown in FIG. 10, whereas projections 8a' and 8d' may be provided on the retainer spring receiving sleeve 8 for engaging the spring members with the retainer spring receiving sleeve. Namely, if the spring members and the retainer spring receiving sleeve may be rotated together, the mounting structure is not limited to the above-described specific structure.

A working sleeve 9 received at its end in the body 2 is fitted in the retainer spring receiving sleeve 8. The working sleeve 9 is rotated together with the retainer spring receiving sleeve 8. However, when a predetermined load is applied to the rotation of the retainer spring receiving sleeve 8, the working sleeve 9 is adapted to rotate through a predetermined angle to the retainer spring receiving sleeve 8.

The rotation of the working sleeve 9 through the predetermined angle to the retainer spring receiving sleeve 8 is attained by a simple structure for inserting the projection 9f inwardly projected and formed in the working sleeve 9 into the elongated hole 8f formed in the retainer spring receiving sleeve 8 (i.e., the tip end opening structure in which the retainer spring receiving sleeve 8 is cut away from the distal tip edge to the proximal end). Accordingly, it is also easy to assemble the working sleeve 9 with the retainer spring receiving sleeve 8.

Also, since the working sleeve 9 is made separately from the rotary sleeve 1 and made of metal, it is possible to form the projection 9f only by, for example, transfer press. Since the longitudinal hole 8f for receiving this projection 9f is formed into the tip end opening shape cut away from the distal end edge to the proximal end side and formed with the same depth as that of the above-described hole portions 8a, 8b, 8c and 8d, the projection 9f may be arranged on the same circumference as that of the retainer spring member 7 and the holder spring member 11. Accordingly, the retainer spring receiving sleeve 8 may be formed short and compact. It is possible to obtain the torque transmission structure that is superior in durability to the nut member 6.

Reference numeral 9c denotes a hole portion into which the projection 11c of the holder spring member 11 is inserted. Numeral 9d denotes a hole portion into which the projection 11d of the holder spring member 11 is inserted. Numeral 9b denotes a hole portion into which the projection 7b of the retainer spring member 7 is inserted. Numeral 9a denotes a hole portion into which the projection 7a of the retainer spring member 7 is inserted.

Also, a pressure portion 10' for depressing the projection 7b of the retainer spring body 7 and a retainer holder portion 10" (inner surface) for depressing the projection 7b are formed in the working sleeve 9. Furthermore, a pressure portion 12' for depressing the projection 11c of the retainer spring member 11 is formed in the working sleeve 9. Incidentally, since this pressure portion 10' and the retainer holder portion 10" are made of metal, the durable use thereof is possible.

A rotary sleeve 1 that rotates together with the working sleeve 9 and is provided with a slippage preventing shape (serration) is fitted around the working sleeve 9. The rotary sleeve 1 is received by a stationary sleeve 15 that is fixed at a tip end to a stepped portion 2' of the body 2 and at a rear end to the body 2. Also, the projections 7a and 7b of the above-described retainer spring member 7 and the projections 11c and 11d of the holder spring member 11 are received by the inner surface of the rotary sleeve 1.

The structure in which the working member 9, the retainer spring receiving sleeve 8 and the nut member 6 are arranged inside the rotary sleeve 1 according to this embodiment has been thus described.

Incidentally, the stationary sleeve 15 may be made of synthetic resin. Also, it is possible to take a structure in which the rotary sleeve 1 is caused to extend to dispense with the stationary sleeve 15 (in this case, the rotary sleeve 1 is supported to the receiving member provided in the body 2).

Reference numeral 16 denotes a C-shaped pull-off preventing ring for the rotary sleeve 1, which is provided on the rear side of the tip end tapered portion of the body 2 and depressingly fitted in a recess groove formed in the body 2. The rotary sleeve 1 is in sliding contact with this pull-off preventing ring 16 and the tip end stepped portion 2' of the body 2. Accordingly, the back-and-forth movement of the rotary sleeve 1 is limited by this pull-off preventing ring 16 and the stepped portion 2'.

Reference numeral 17 denotes a receiving portion for receiving the retainer spring member 7 and the holder spring member 11.

In operation, the chuck device according to the first embodiment of the present invention will work as follows. When the tool 4 is gripped by means of the claws 3 and the rotary sleeve 1 is rotated, until a predetermined load is applied to the rotary sleeve 1, the rotary sleeve 1, the working sleeve 9, the retainer spring receiving sleeve 8 and the nut member 6 are rotated together. Accordingly, the holder spring body 11 and the retainer spring body 7 are also rotated around the ratchet tooth wheel 5. When the rotary sleeve 1 is rotated to the predetermined position (i.e., the position where the claws 3 are rotated corresponding to the tool 4), the predetermined load is applied to the rotary sleeve 1 (in the condition of FIG. 3). When the rotary sleeve 1 is further rotated from that condition, the working sleeve 9 is rotated relative to the retainer spring receiving sleeve 8 (within the range of the elongated hole 8f). The pressure portion 10' as the retainer working portion 10 depresses the projection 7b of the retainer spring member 7. The retainer holder portion 10" as the retainer working portion 10 receives the projection 7b (under pressure). The tip end retainer portion 7' of the retainer spring member 7 is brought into abutment with the ratchet tooth wheel 6 with the projection 9f being brought into abutment with the end portion of the elongated hole 8f. The nut member 6 is rotated to increase the fastening force. The tip end retainer portion 7' rides over the ratchet teeth of the wheel 5 one by one and retained at the predetermined ratchet tooth by the leaf spring effect (in the condition that the retainer portion is riding over the teeth one by one, the fastening operation has not yet been completed, and when the fastening operation has been finished, the riding-over of the teeth is stopped). Under this condition, the rotational resistance of the rotary sleeve 1 is increased and the loosening of the coupling of the tool 4 is prevented by the spring force of the retainer spring member 7 (see FIG. 4). In this case, the pressure portion 12' depresses the projection 11c of the holder spring retainer 11, and the projection 11c is inserted into the hole portion 9a. Therefore, the engagement condition between the ratchet tooth of the wheel 5 and the tip end retainer portion 7' of the retainer spring member 7 is held without fail by the engagement between the projection 11c of the holder spring member 11 and the hole portion 9a. The loosening of the coupling of the tool 4 is prevented as much as possible (in this sense, the position holding portion 12 is constituted by the projection 11c of the holder spring member 11 and the hole portions 9c and 9a of the working sleeve 9).

Incidentally, the timing when the working sleeve 9 starts the rotation relative to the retainer spring receiving sleeve 8 depends upon the setup of the spring force of the holder spring member 11.

In order to release this coupled condition, when the rotary sleeve 1 is rotated in the reverse direction, the fastening of the tool 4 is loosened by the opposite action to that described above.

Figure 6:
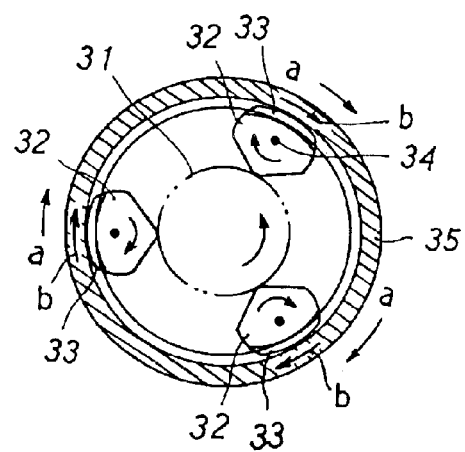
FIG. 6 is an illustration showing a loosened phenomenon of coupling in an electric power tool according to this embodiment.

By the way, as shown in FIG. 6, when the rotational direction of the body is in the direction indicated by arrows a, the propelling force is applied intermittently in the axial direction so that a twist force (indicated by arrows in claws 32) intermittently occurs in the claw 32 about the slant shaft 34 of the claw 32. The repeated twist force causes the force for loosing (indicated by an arrow b in the nut member 35) to occur in an engagement portion 33 between each claw 32 and a nut member 35. As a result, the fastening of the tool 31 is loosened.

In particular, in case of this kind electric power rotary tool having a high drilling speed and a high power, naturally, the twist force generated in the claws 32 is also large so that the fastening of the tool 31 is largely loosened.

Accordingly, U.S. Pat. No. 5,765,839 (hereinafter referred to as the conventional example 1) discloses a chuck device having a structure for preventing the loosening.

In the conventional example 1, after the tool has been fastened, the coupling of the tool is prevented from being loosened by a ratchet mechanism. However, this suffers from the following problem.

Namely, in the conventional example 1, since ratchet means retained at a ratchet tooth for performing a ratchet function and retaining means for holding the current position of the ratchet means are constituted by a single piece of leaf spring, for example, in the case where the ratchet means has a high mechanical strength that is durable against the stronger force, it is very difficult to realize such a structure. As described above, in the case where the structure is used in the high output electric power rotary tool, it is unnecessary to strengthen the retaining means in conformity with the high output electric power rotary tool but it is sufficient to set the strength to a predetermined level. However, it is necessary to use the ratchet means that is strong in conformity with the output as described above. If the ratchet means is strengthened for the high output electric power rotary tool, naturally, the retaining means is also to be strengthened because of the single piece leaf spring. Strengthening the retaining means would mean the very poor operationability. Incidentally, for instance, there is an approach to prepare a leaf spring whose plate thickness is partially changed. This is very troublesome and not practical.

Also, in the case where a strong leaf spring having a large plate thickness is used as the spring for the high output electric power rotary tool, the leaf spring is curved in an arcuate form and assembled into the structure. This is also very troublesome.

Therefore, in order to solve this problem, for instance, U.S. Pat. No. 5,458,345 (hereinafter referred to as the conventional example 2) proposes another approach.

In this conventional example 2, discrete members are used for the ratchet means and the retaining means, respectively. However, this system also suffers from the following problem.

This conventional example 2 has a problem in durability because the retaining means is made of synthetic resin. Namely, since the retaining means is subjected to a thermal deformation (change in elastic constant) by the heat generated during the drilling work and the retaining force is changed, the position of the above-described ratchet means is not suitable. Also, naturally, the retaining means made of synthetic resin is repetitively continuously used, resulting in degradation of a so-called elasticity. The example suffers from the problem in this point.

Accordingly, the conventional example 2 may solve the problem inherent in the conventional example 1 by separating the ratchet means and the retaining means but would be still insufficient due to the problem of thermal deformation.

By the way, in the case where the electric rotary tool is locked during the working operation, a large twist force is applied to the tool a twist is generated about the slant shaft 34 of the claw 32 and the large force is left about the center of the engagement portions 33 of the nut member 35. In this case, in order to release the engagement of the tool 31 in a reverse manner, a large loosening torque is needed to the rotary sleeve (the sleeve member for gripping to rotate the nut member 35).

Therefore, in order to solve this point, for example, U.S. Pat. No. 5,829,761 (hereinafter referred to conventional example 3) has been proposed. In this conventional example 3, for the purpose of transmission of the torque from an outer sleeve (rotary sleeve) to an inner ring (nut member), a complicated structure is used inside of the outer sleeve. Accordingly, the soft material (resin) has to be used inside the outer sleeve. Accordingly, the structure becomes a sandwich structure of the outer sleeve, the soft material and the intermediate ring. Accordingly, the outer sleeve is coupled with the intermediate ring through the bypass. Correspondingly, the manufacture is difficult. Furthermore, the existence of the different material is not suitable also in view of the current situation of the recycle for separation of material.

In view of the foregoing point, in the first embodiment, since the retainer spring member 7 and the holder spring member 11 are provided separately from each other, for example, even if the retainer spring member 7 having the strong spring force is used for the high output electric power rotary tool, the spring force of the holder spring member 11 is not always increased unlike the conventional example 1. Accordingly, in spite that the loosening of the coupling hardly would take place, it is possible to provide the chuck device that is superior in operability and does not need any large force for releasing the locked condition after the completion of the drilling work, for example. According to the first embodiment, it is possible to provide the chuck device in which any desired retainer spring member 7 and holder spring body 11 may be mounted for the characteristics of the electric power rotary tool. The chuck device is thus superior in practical use.

Furthermore, according to the first embodiment, since all the components including the holder spring member 11 are made of metal, the deformation due to the heat generated together with the drilling work as in the conventional example 2 (change in elastic constant) may be prevented as much as possible. Correspondingly, it is possible to provide the chucking device in which the coupling hardly would be loosened and that is durable for the repetitive continuous use.

Accordingly, it is possible to provide the chuck device in which the loosening of the coupling of the tool 4 may be prevented without fail and which is superior in recycle characteristics and in durability with the simple structure.

Figure 7:
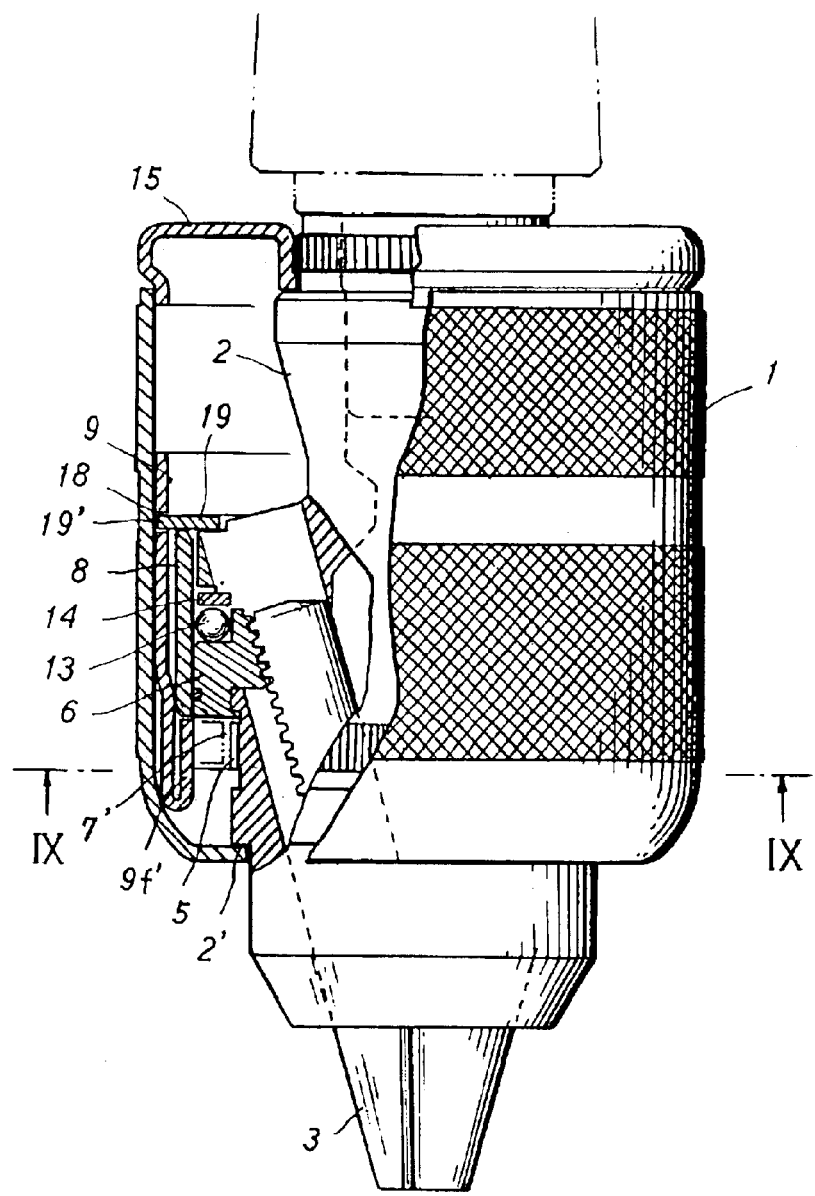
FIG. 7 is a partially fragmentary, frontal view of a chuck device according to a second embodiment of the present invention.
Figure 8:
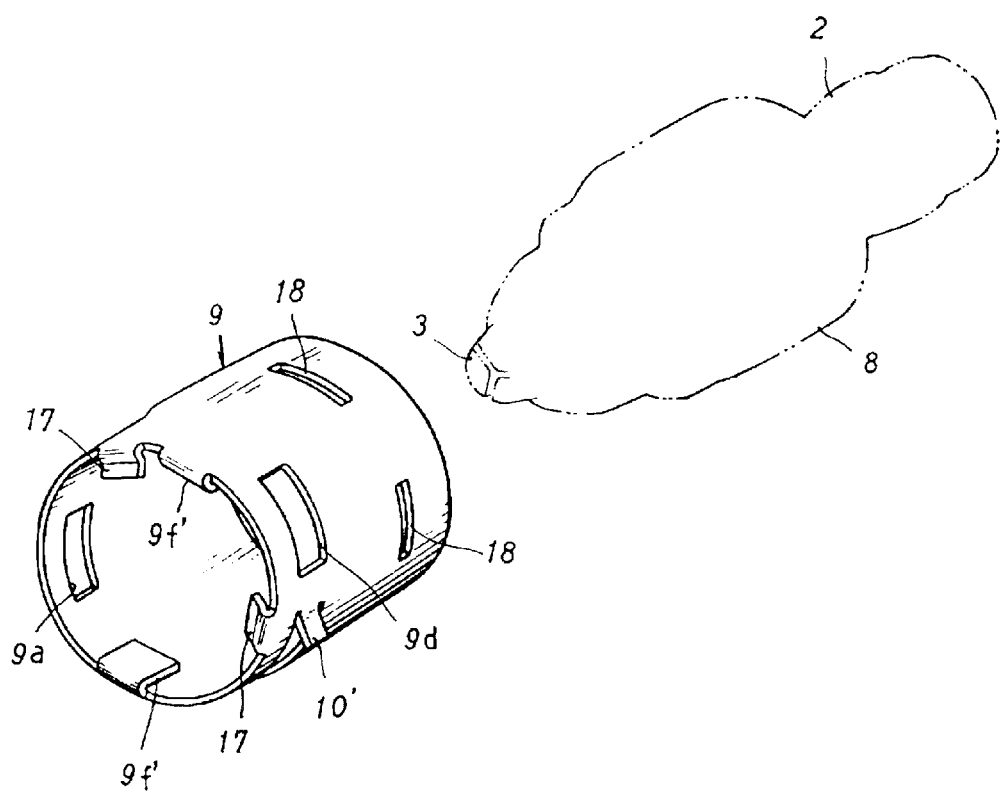
FIG. 8 is an exploded perspective view of a primary part of the chuck device shown in FIG. 7.
Figure 9:
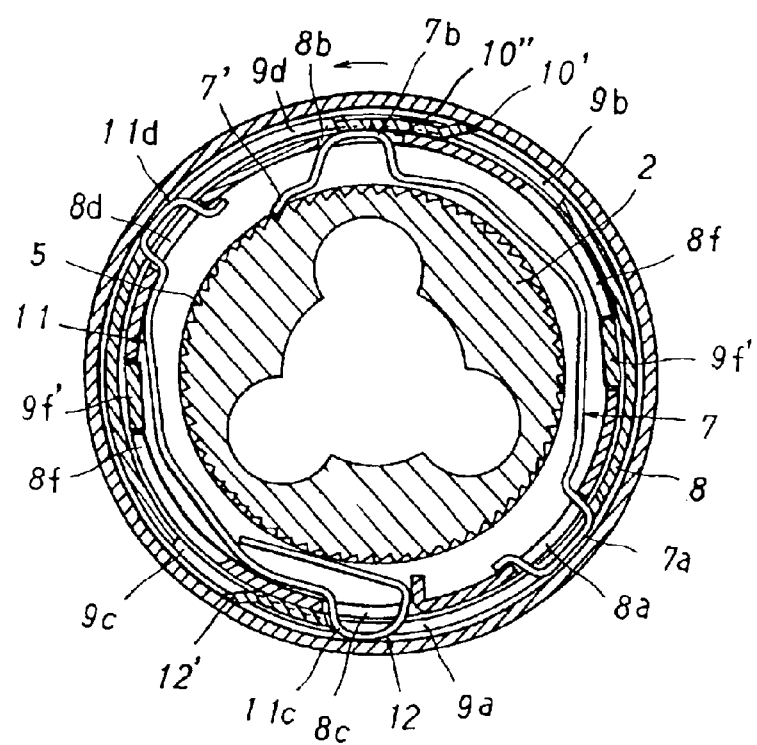
FIG. 9 is a cross-sectional view corresponding to FIG. 4 taken along the line IX—IX of FIG. 7 according to the second embodiment of the invention.

FIGS. 7 to 9 show a second embodiment of the present invention. This will now be described.

In the second embodiment, the working sleeve 9 is bent at tip end to form a projection 9f' (corresponding to the projection 9f of the first embodiment).

In the working sleeve 9 of the second embodiment, several slits 18 are provided close to the proximal end thereof. Projecting pieces 19' of a snap ring 19 are inserted into the slits 18. Accordingly, the working sleeve 9 is retained at the body 2 by means of the snap ring 19. As a result, the forward movement of the rotary sleeve 1 is limited by means of the working sleeve 9 and the rearward movement is limited by means of the above-described stepped portion 2'.

The other structure is the same as that of the first embodiment.

FIGS. 11 to 14 show a third embodiment of the present invention. This will now be described.

The third embodiment is different from the first embodiment and the second embodiment in movement of the retainer spring member 7.

Figure 13:
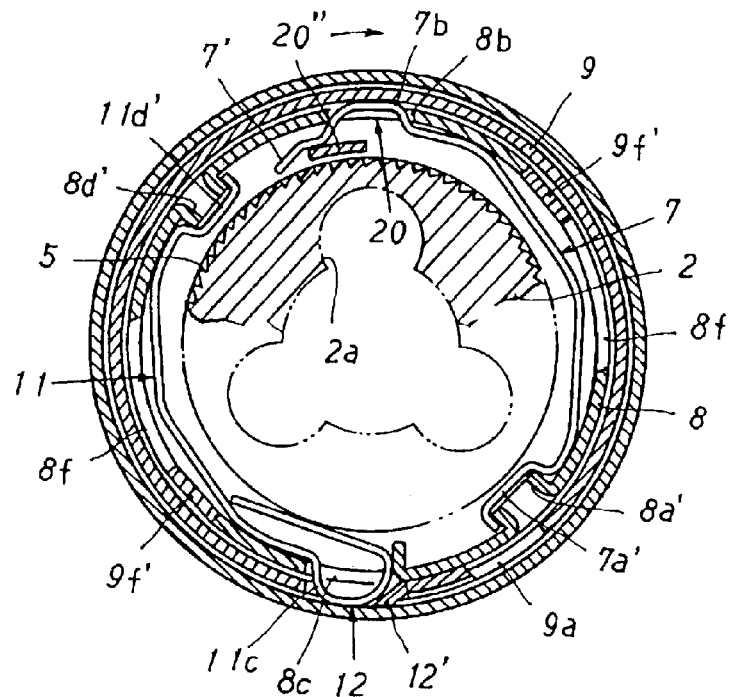
FIG. 13 is a cross-sectional view corresponding to FIG. 3 taken along the line XIII—XIII of FIG. 11 according to the third embodiment of the invention.
Figure 14:
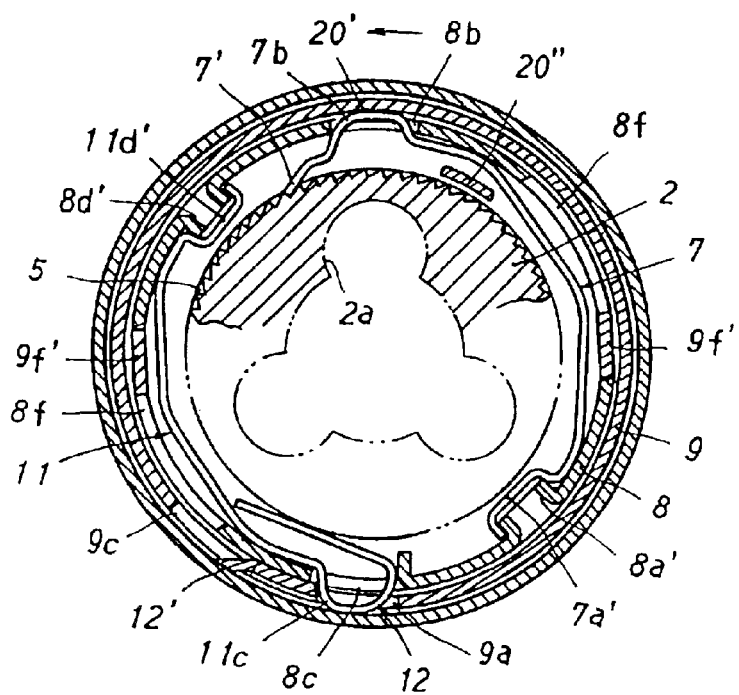
FIG. 14 is a cross-sectional view corresponding to FIG. 4 taken along the line XIV—XIV of FIG. 11 according to the third embodiment of the invention.

Namely, when the tool 4 is coupled, the rotary sleeve 1 is rotated and the predetermined load is applied to the rotary sleeve 1, the working sleeve 9 is rotated to the retainer spring receiving sleeve 8, so that the retainer condition release portion 20" (a piece formed by bending the working sleeve 9) provided in the working sleeve 9 is moved from the condition of FIG. 13 to the condition of FIG. 14. The tip end retainer portion 7' of the retainer spring member 7 that is separated from the ratchet tooth wheel 5 by means of this piece is retained at the ratchet tooth wheel 5 by its elasticity. This condition is maintained by a retainer holding portion 20' (an inner surface of the working sleeve 9).

The other is the same as that of the first embodiment and the second embodiment.

As described above, the first embodiment, the second embodiment and the third embodiment are different from each other in structure for mounting the retainer spring member 7 and the holder spring member 11 on the retainer spring receiving sleeve 8, the structure (shape) of the member moving within the elongated hole 8f of the retainer spring receiving sleeve 8, and the structure for releasing and engaging between the retainer spring member 7 and the ratchet tooth wheel 5. It is possible to use any other structure other than the combination shown.

What is claimed is:

1. A keyless chuck, comprising:

a generally cylindrical body defining an axis and having a forward portion and a rearward portion with respect to the axis, the forward portion including a radially outward projecting portion of the body, the body further including a plurality of guides extending obliquely to the axis and converging toward the forward portion, and a groove extending around the body;

a plurality of jaws corresponding to the plurality of guides, each jaw being slidably disposed within the respective guide and including a thread section along an outer surface thereof;

a jaw-engaging mechanism configured to operably engage the groove and to be rotatable around the body, the jaw-engaging mechanism including a thread section configured to complementarily engage the thread sections of the jaws;

a toothed member configured to extend around the body;

an inner sleeve extending over the jaw-engaging mechanism and the toothed member and configured to be capable of rotating the jaw-engaging mechanism so as to cause the jaws to move in the guides toward the forward portion;

a pair of spring members operably engaged with the inner sleeve so as to be disposed adjacent to the toothed member, one of the spring members being adapted to form a ratchet with the toothed member;

an outer sleeve extending over the inner sleeve; and an intermediate sleeve comprised of a metal and disposed between the inner and outer sleeves so as to be capable of engaging the pair of springs, the intermediate sleeve being configured to be rotatable with respect to the inner sleeve upon application of a first torque therebetween, the intermediate sleeve, upon application of the first torque, further being configured to urge the one of the spring members into ratcheting engagement with the toothed member, and to cooperate with the other of the spring members so as to prevent rotation between the intermediate sleeve and the inner sleeve, upon application therebetween of a second torque greater than the first torque, such that the ratcheting engagement is maintained and the jaws are prevented from retracting along the guides away from the forward portion of the body.

2. A chuck according to claim 1 wherein the spring members are comprised of a metal.

3. A chuck according to claim 1 further comprising a retaining member disposed externally to the outer sleeve toward the forward portion of the body, the retaining member being operably engaged between the body and the outer sleeve so as to axially constrain the outer sleeve with respect to movement toward the forward portion of the body.

4. A chuck according to claim 1 further comprising a retaining member disposed substantially within the intermediate sleeve, the retaining member being operably engaged with and extending between the body and the intermediate sleeve, rearward of the radially outward projecting portion of the body, the retaining member being configured to axially constrain the intermediate sleeve with respect to movement toward the forward portion of the body.

5. A chuck according to claim 4 wherein the inner sleeve is press-fit with respect to and extends around the jaw-engaging mechanism.

6. A chuck according to claim 4 wherein the retaining member further comprises a stop ring having a radially-extending portion, the stop ring being insertable into the intermediate sleeve so as to allow the radially-extending portion to engage the at least one circumferentially-extending slot, the stop ring further being configured to extend radially inward of the radially outward projecting portion of the body.

7. A chuck according to claim 4 wherein the retaining member is disposed rearward of the jaw-engaging mechanism.

8. A chuck according to claim 4 wherein the intermediate sleeve defines at least one circumferentially-extending slot.

9. A chuck according to claim 8 wherein the retaining member further comprises a C-shaped stop ring having at least one tab about an outer circumference thereof, the C-shaped stop ring being insertable into the intermediate sleeve such that, when the at least one tab engages the at least one circumferentially-extending slot, the C-shaped stop ring extends radially inward of the radially outward projecting portion of the body.

10. A chuck according to claim 9 wherein, when the at least one tab engages the at least one circumferentially-extending slot, the at least one tab extends radially outward adjacent the outer sleeve.

11. A method of securing a keyless chuck, the chuck including a generally cylindrical body defining an axis and having a forward portion and a rearward portion with respect to the axis, the forward portion including a radially outward projecting portion of the body, the body further including a plurality of guides extending obliquely to the axis and converging toward the forward section, and a groove extending around the body, the chuck further including a plurality of jaws corresponding to the plurality of guides, each jaw being slidably disposed within the respective guide and including a thread section along an outer surface thereof, and a jaw-engaging mechanism configured to operably engage the groove and to be rotatable around the body, the jaw-engaging mechanism including a thread section configured to complementarily engage the thread sections of the jaws, the chuck also including a toothed member configured to extend around the body, an inner sleeve extending over the jaw-engaging mechanism and the toothed member and configured to be capable of rotating the jaw-engaging mechanism so as to cause the jaws to move in the guides toward the forward portion, a pair of spring members operably engaged with the inner sleeve so as to be disposed adjacent to the toothed member, one of the spring members being adapted to form a ratchet with the toothed member, an outer sleeve extending over the inner sleeve, and an intermediate sleeve comprised of a metal and disposed between the inner and outer sleeves so as to be capable of engaging the pair of springs, the intermediate sleeve being configured to be rotatable with respect to the inner sleeve, and, said method comprising:

applying a first torque between the metallic intermediate sleeve and the inner sleeve so as to urge the one of the spring members into ratcheting engagement with the toothed member; and applying a second torque, greater than the first torque, between the metallic intermediate sleeve and the sleeve such that the intermediate sleeve cooperates with the other of the spring members so as to prevent rotation between the intermediate sleeve and the inner sleeve and to thereby maintain the ratcheting engagement to prevent the jaws from retracting along the guides away from the forward portion of the body.

\* \* \* \* \*

UNITED STATES PATENT AND TRADEMARK OFFICE
CERTIFICATE OF CORRECTION

PATENT NO. : 6,824,141 B1
DATED : November 30, 2004
INVENTOR(S) : Sakamaki et al.

It is certified that error appears in the above-identified patent and that said Letters Patent is hereby corrected as shown below:

Column 14,
Line 9, prior to the second occurance of "sleeve" insert the word -- inner --.

Signed and Sealed this

Twenty-second Day of March, 2005

JON W. DUDAS
*Director of the United States Patent and Trademark Office*